United States Patent
Getty et al.

(10) Patent No.: US 12,174,849 B2
(45) Date of Patent: Dec. 24, 2024

(54) VALIDATION OF ETL PIPELINE USING ASSERT DATA

(71) Applicant: Microsoft Technology Licensing, LLC, Redmond, WA (US)

(72) Inventors: Kyle Kraeger Getty, Renton, WA (US); Robert Aron Drollinger, Bellevue, WA (US); Rushabh Anilkumar Doshi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/312,450

(22) Filed: May 4, 2023

(65) Prior Publication Data

US 2024/0370451 A1    Nov. 7, 2024

(51) Int. Cl.
*G06F 17/00* (2019.01)
*G06F 16/25* (2019.01)

(52) U.S. Cl.
CPC ................... *G06F 16/254* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 11,269,913 B1* | 3/2022 | Dervay | G06F 21/6218 |
| 2004/0215584 A1* | 10/2004 | Yao | G06F 16/254 706/12 |
| 2008/0168082 A1* | 7/2008 | Jin | G06F 8/20 707/999.102 |
| 2008/0222634 A1* | 9/2008 | Rustagi | G06F 9/5038 718/100 |
| 2010/0161576 A1* | 6/2010 | Chen | G06F 16/283 707/705 |
| 2011/0047525 A1* | 2/2011 | Castellanos | G06F 16/283 718/103 |
| 2011/0295795 A1* | 12/2011 | Venkatasubramanian | G06F 16/254 707/602 |
| 2013/0238550 A1* | 9/2013 | Mandelstein | G06F 16/254 707/602 |
| 2013/0238596 A1* | 9/2013 | Mandelstein | G06F 16/254 707/716 |
| 2015/0081619 A1* | 3/2015 | Brown | G06F 16/254 707/602 |
| 2019/0130007 A1* | 5/2019 | Hao | G06F 17/18 |
| 2020/0004862 A1* | 1/2020 | Bauer | G06F 16/254 |
| 2020/0334089 A1* | 10/2020 | Ramanathan | G06F 9/45558 |

(Continued)

OTHER PUBLICATIONS

International Search Report and Written Opinion received for PCT Application No. PCT/US2024/026725, Aug. 27, 2024, 13 pages.

*Primary Examiner* — Hung D Le
(74) *Attorney, Agent, or Firm* — Alleman Hall & Tuttle LLP (57) ABSTRACT

A computing system is provided, which is configured to instantiate a testing environment, define an extract, transform, load (ETL) pipeline within the testing environment, generate a test data set to be inputted into the ETL pipeline, generate assert data predicting an output of the ETL pipeline based on the generated test data set, input the test data set into the ETL pipeline to generate output data, compare the assert data to the output data, and validate the output data using the assert data to generate validation data.

20 Claims, 7 Drawing Sheets

(56) References Cited

U.S. PATENT DOCUMENTS

| | | | | |
|---|---|---|---|---|
| 2020/0334267 | A1* | 10/2020 | Ramanathan | G06F 16/254 |
| 2020/0356575 | A1* | 11/2020 | Krishnan | G06F 8/65 |
| 2021/0012236 | A1* | 1/2021 | Carrasco | G06N 5/04 |
| 2021/0090745 | A1* | 3/2021 | Leavitt | G06F 16/254 |
| 2021/0294813 | A1* | 9/2021 | Knecht | G06F 16/252 |
| 2021/0342359 | A1* | 11/2021 | Roy | G06F 7/582 |
| 2022/0121674 | A1* | 4/2022 | Hasan | G06F 16/27 |
| 2022/0182718 | A1* | 6/2022 | Yelda | H04L 67/568 |
| 2022/0269689 | A1* | 8/2022 | Chattopadhyay | G06F 16/254 |
| 2022/0374442 | A1* | 11/2022 | Kaspa | G06F 16/2282 |
| 2023/0004574 | A1* | 1/2023 | Hu | G06F 8/433 |
| 2023/0074414 | A1* | 3/2023 | Mudigonda | G06F 16/211 |
| 2023/0086750 | A1* | 3/2023 | Battistoni | G06F 11/328 |
| | | | | 707/694 |
| 2023/0153086 | A1* | 5/2023 | Ahmed | G06F 8/433 |
| | | | | 717/143 |
| 2023/0169085 | A1* | 6/2023 | Verma | G06F 21/6218 |
| | | | | 707/602 |
| 2023/0367784 | A1* | 11/2023 | Jacobs | G16H 10/60 |
| 2024/0054144 | A1* | 2/2024 | Kaspa | G06F 16/26 |
| 2024/0193174 | A1* | 6/2024 | Manzano | G06F 16/254 |

* cited by examiner

FIG. 1

| TEST DATA SET 22 ||||| 
|---|---|---|---|---|
| DATE | BUSINESS GROUP | ASSET TAG | FACILITY NO | ITEM TYPE |
| 10/9/FY1 | BG1 | 001 | FAC-1 | TYPE 1 |
| 12/11/FY1 | BG2 | 002 | FAC-2 | TYPE 1 |
| 8/1/FY1 | BG3 | 003 | FAC-3 | TYPE 2 |
| 10/9/FY2 | BG1 | 004 | FAC-1 | TYPE 3 |
| 12/9/FY2 | BG4 | 005 | FAC-4 | TYPE 4 |
| 12/9/FY3 | BG5 | 006 | FAC-5 | TYPE 4 |
| 12/8/FY3 | BG5 | 007 | FAC-5 | TYPE 2 |
| 10/1/FY3 | BG2 | 008 | FAC-2 | TYPE 1 |

OUTPUT DATA 30

| FISCAL YEAR | BUSINESS GROUP | TOTAL CARBON EMISSIONS |
|---|---|---|
| FY1 | BG1 | 2.0 |
| FY1 | BG2 | 2.0 |
| FY1 | BG3 | 3.0 |
| FY2 | BG1 | 1.0 |
| FY2 | BG4 | 4.0 |
| FY3 | BG5 | 5.0 |
| FY3 | BG5 | 5.0 |
| FY3 | BG2 | 2.0 |

ASSERT DATA 38

| FILTER (38a) | EXPRESSION (38b) |
|---|---|
| {Fiscal Year} == "FY1" && {Business Group} == "BG1" | {Total Carbon Emissions} == 2 |
| {Fiscal Year} == "FY2" && {Business Group} == "BG4" | {Total Carbon Emissions} == 4 |
| {Fiscal Year} == "FY3" && {Business Group} == "BG5" | {Total Carbon Emissions} == 5 |
| {Fiscal Year} == "FY1" && {Business Group} == "BG3" | {Total Carbon Emissions} == 3 |
| {Fiscal Year} == "FY3" && {Business Group} == "BG2" | {Total Carbon Emissions} == 2 |
| {Fiscal Year} == "FY2" && {Business Group} == "BG1" | {Total Carbon Emissions} == 1 |
| {Fiscal Year} == "FY1" && {Business Group} == "BG2" | {Total Carbon Emissions} == 2 |

FIG. 3

| JOINED DATA 48 | | ACTUAL VALUES ⁠—48a | ACTUAL EXPECTED VALUES ⁠—48b |
|---|---|---|---|
| FISCAL YEAR | BUSINESS GROUP | ACTUAL VALUES | ACTUAL EXPECTED VALUES |
| FY1 | BG1 | 2.0 | 2.0 |
| FY1 | BG2 | 2.0 | 2.0 |
| FY1 | BG3 | 3.0 | 3.0 |
| FY2 | BG1 | 1.0 | 1.0 |
| FY2 | BG4 | 4.0 | 4.0 |
| FY3 | BG5 | 5.0 | 5.0 |
| FY3 | BG5 | 5.0 | 5.0 |
| FY3 | BG2 | 2.0 | 2.0 |

FIG. 4

| VALIDATION RESULTS 58 | | | |
|---|---|---|---|
| FISCAL YEAR | BUSINESS GROUP | ACTUAL VALUES | VALIDATION RESULTS |
| FY1 | BG1 | 2.0 | VALIDATED |
| FY1 | BG2 | 2.0 | VALIDATED |
| FY1 | BG3 | 3.0 | VALIDATED |
| FY2 | BG1 | 1.0 | VALIDATED |
| FY2 | BG4 | 4.0 | VALIDATED |
| FY3 | BG5 | 5.0 | VALIDATED |
| FY3 | BG5 | 5.0 | VALIDATED |
| FY3 | BG2 | 2.0 | VALIDATED |

VALIDATION OF ETL PIPELINE USING ASSERT DATA

BACKGROUND

An ETL (Extract, Transform, Load) pipeline is a process used to extract data from various sources, transform the data, and load the transformed data to a target destination such as a database. ETL pipelines are commonly used in a wide range of data-related applications, including data analytics, data migration across different computing systems and networks, the integration and aggregation of data from various sources and formats into a single data set, data cleansing, and machine learning.

However, the validation of the output of ETL pipelines can be a challenge, especially when processing large volumes of output data. The complexity of the data transformations of ETL pipelines may also make it difficult to validate the accuracy and completeness of their output.

SUMMARY

In view of the above, a computing system is provided, comprising a processor, and a memory storing executable instructions that, in response to execution by the processor, cause the processor to instantiate a testing environment, define an ETL pipeline within the testing environment, generate a test data set to be inputted into the ETL pipeline, generate assert data predicting an output of the ETL pipeline, based on the generated test data set, input the test data set into the ETL pipeline to generate output data, compare the assert data to the output data, and validate the output data using the assert data to generate validation data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In view of the above issues, the present disclosure describes a system and method for implementing assertions in assert data to efficiently validate the output of an ETL pipeline. Such a system and method are described below in further detail.

Figure 1:
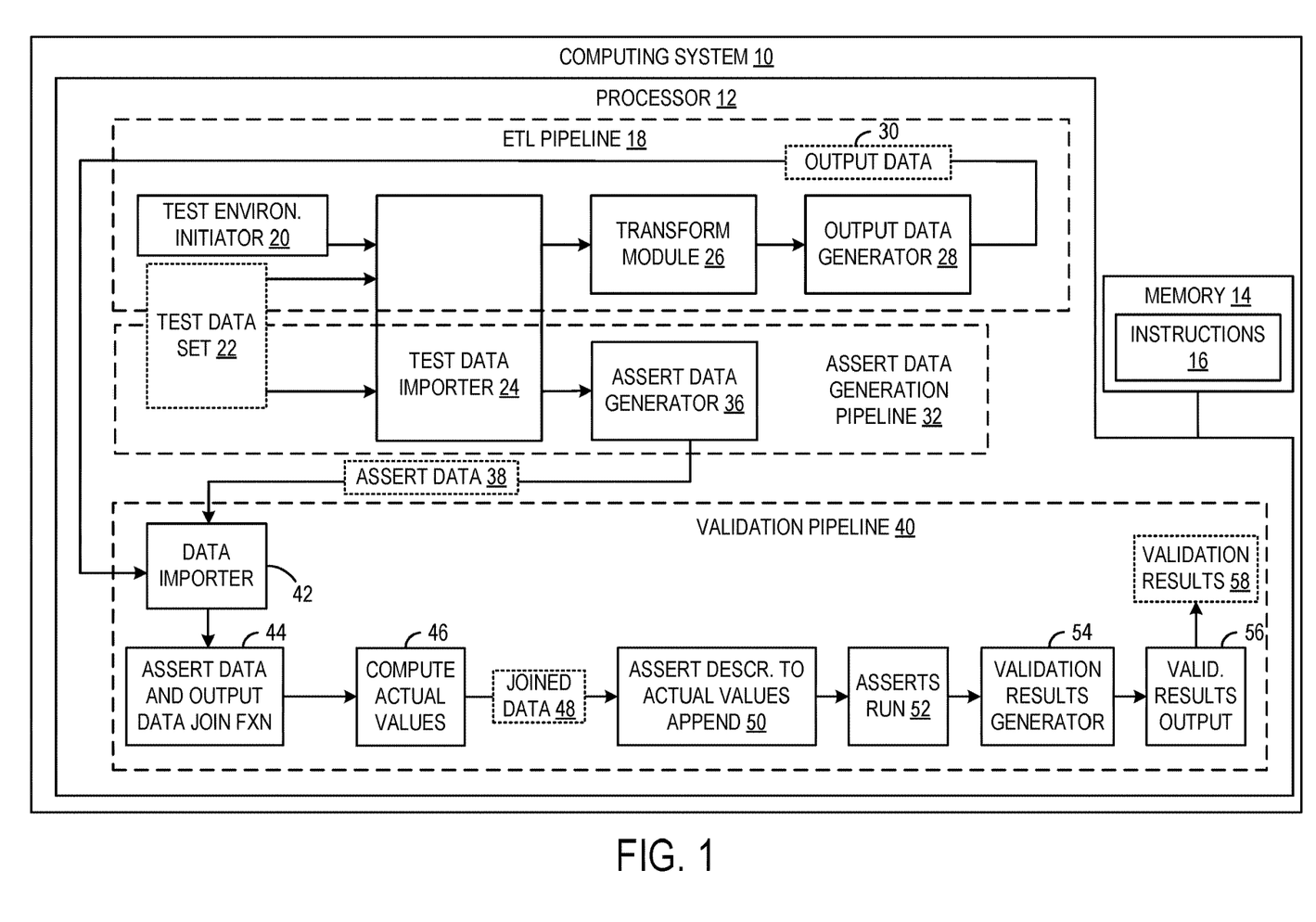
FIG. 1 shows a schematic view of a computing system including an ETL pipeline, an assert data generation pipeline, and a validation pipeline, in accordance with one example of the present disclosure.

Referring to FIG. 1, an embodiment of a computing system 10 is depicted, comprising, by way of non-limiting example, a processor 12 and a memory 14 storing executable instructions 16 that, in response to execution by the processor 12, cause the processor 12 to perform the functions recited herein. Specifically, processor 12 executing these instructions is configured to instantiate a testing environment, define an ETL pipeline 18 within the testing environment, generate a test data set 22 to be inputted into the ETL pipeline 18, generate assert data 38 predicting an output of the ETL pipeline 18 based on the generated test data set 22, input the test data set 22 into the ETL pipeline 18 to generate output data 30, compare the assert data 38 to the output data 30, and validate the output data 30 using the assert data to generate validation data 58.

The ETL pipeline 18 may be executed using different types of computing systems depending on the complexity of the pipeline and the volume of data being processed. For example, the ETL pipeline 18 may be executed on dedicated on-premise servers or clusters that are hosted within an organization's data center or infrastructure. In some implementations, the ETL pipeline 18 may be executed on cloud-based systems such as Amazon Web Services (AWS), Microsoft Azure, or Google Cloud Platform (GCP), or big data platforms such as Apache Hadoop or Apache Spark.

The ETL pipeline 18 is configured to extract data from various sources, import the extracted test data set 22, transform the extracted data into output data 30 by running the ETL pipeline 18, and send the output data 30 to the validation pipeline 40. Examples of the data sources of the test data set 22 may include randomly generated data, raw or redacted data collected from the real world, static or dynamic synthetic data created through automated processes, manually crafted test data, and manually crafted test assert data. Real world data may be collected from various sources including relational databases, cloud services, IoT devices, streaming data, and web services. Accordingly, the ETL pipeline 18 may be used to integrate data from disparate sources and enable analysis and reporting.

The ETL pipeline 18 includes a test environment initiator 20 configured to set up a test environment for the ETL pipeline 18. The test environment may be set up by creating a replica of the production environment that contains the test data set 22 to test the functionality of the ETL pipeline 18. Once the test environment is set up, the test data importer 24 of the ETL pipeline 18 imports the test data set 22. The test data importer 24 may connect to source data systems and extract the data to be transformed, which may be in different formats, such as CSV, XML, or JSON. The test data set 22 may be an integration data set, which includes data combined from multiple, disparate data sources.

The transform module 26 of the ETL pipeline 18 transforms the test data set 22 into a desired format or structure. For example, the transformations performed by the transform module 26 may include removing or correcting errors in the data, removing or adding columns or other data fields, cleaning up missing or invalid values, converting data types, or standardizing data formats.

The output data generator 28 of the ETL pipeline 18 further processes the transformed data set into output data 30, which is outputted to be imported by the validation pipeline 40.

The processor 12 also executes an assert data generation pipeline 32 to generate assert data 38 based on the test data set 22. The test data set 22 imported by the test data importer 24 is received as input by the assert data generator 36 of the assert data generation pipeline 32 to generate the assert data 38, which includes assertions, or statements or conditions that must be true in order for the ETL pipeline 18 to be considered successful. These assertions may be formatted into a table of statements which specify the validation criteria for the output data 30. The assert data generator 36 may generate assert data 38 through automated processes or receive user input for the user to manually craft the assert data 38. The assertions of the assert data 38 are used in the validation pipeline 40 to validate the output data 30.

For example, a Boolean assertion in the assert data 38 may express a probability that a property of the output data 30 is true. A quantity assertion in the assert data 38 may specify that the number of records in the transformed data should match the number of records in the source data. For example, a row count validation assertion may specify that the number of rows in the output data 30 must match a specific value, or the number of columns in the output data 30 must match a specific value. Another assertion in the assert data 38 may specify that a certain field or column in the transformed data should or should not have a specific data type or format. For example, a null value validation assertion may specify that specific columns in the output data 30 must not have null values. A value validation assertion may specify that the values in a specific column or set of columns in the output data 30 must have specific values or values within ranges of values. A format validation assertion may specify that the values in the output data 30 must follow a predetermined format or pattern.

The processor 12 also executes the validation pipeline 40 to validate the output data 30 to ensure that the output data 30 meets predetermined validation criteria, so that accuracy, consistency, and completeness of the output data 30 may be validated. The data importer 42 of the validation pipeline 40 imports the output data 30 and the assert data 38. The data importer 42 may map the imported output data 30 to appropriate tables and columns, thereby ensuring that the output data 30 is stored in a format that can be easily queried and analyzed. A join function 44 joins the assert data 38 and the output data 30 together, then a compute function 46 computes the actual values of the output data 30 to be validated by creating an assert actual value column containing the values in the columns of the output data 30 to be validated, thereby generating the joined data 48. The assert data 38 contains a property specifying how the assertions of the assert data 38 are associated with the output data 30. For example, the property may define which columns in the assertions correspond to which columns in the output data 30, and the columns in the assertions and the columns in the output data 30 that are defined by the property are joined by the join function 44.

An append function 50 appends an assert description to the assert actual value column, so that failed values can easily be identified during validation. An asserts run function 52 runs the assertions in the assert data 38 to compare the assert data 38 to the output data 30. A validation results generator 54 generates the validation results 58 subsequent to running the asserts in the assert data 38. The validation results 58 may subsequently be outputted for display by the validation results output function 56, or used to modify the ETL pipeline 18 to address any failures that were identified during validation. Upon failure of validation, the assert description may be displayed for failed values in the output data 30. The outputted validation results 58 may also be used for reporting and analysis, such as generating dashboards or visualizations of data flows.

Figure 2:
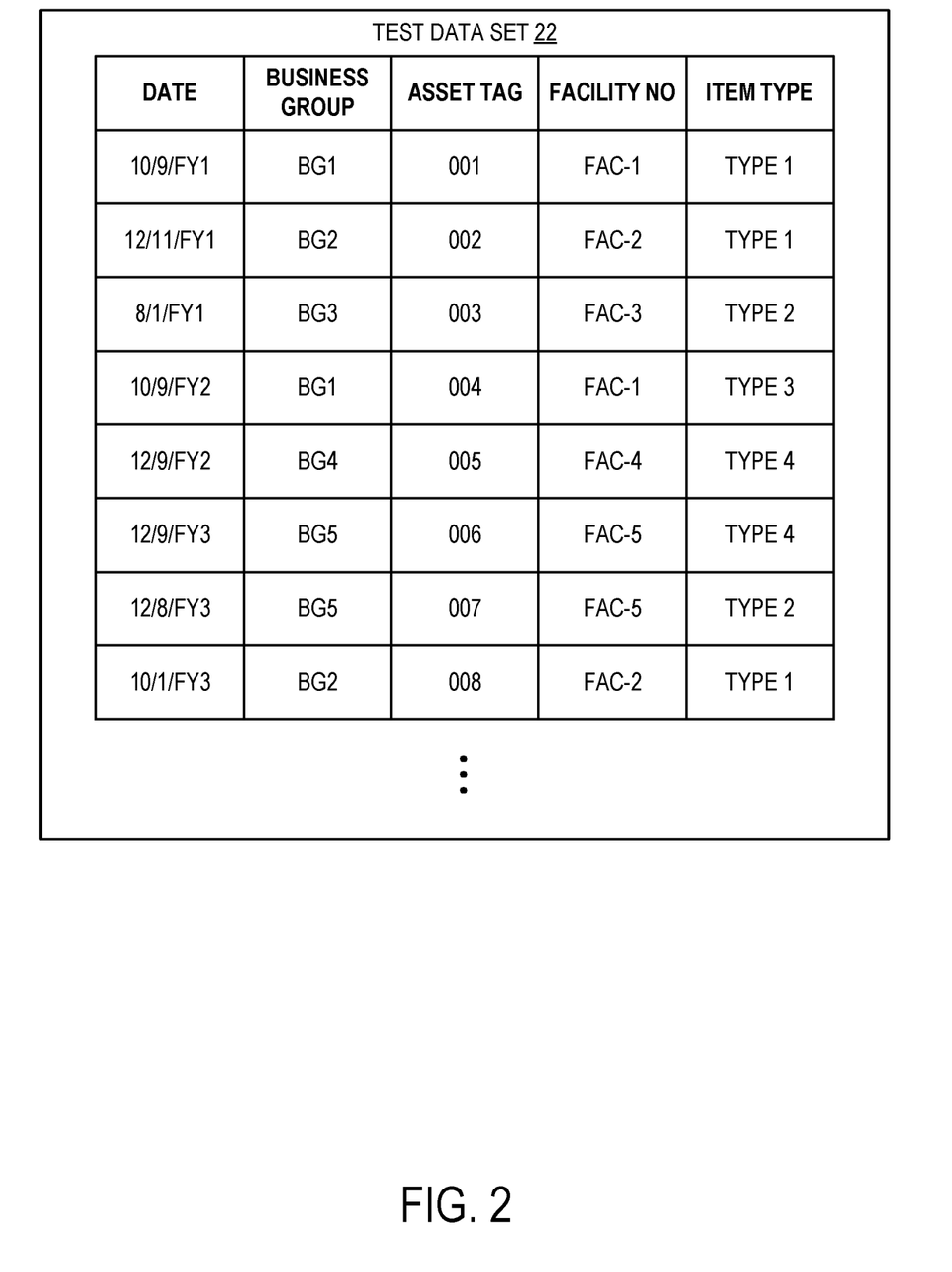
FIG. 2 shows an example of a test data set of the computing system of FIG. 1.

Turning to FIG. 2, one exemplary implementation of the computing system of FIG. 1 is described, in which an annual sustainability report is being synthesized to report carbon emission numbers by fiscal year of installation and business group. In this example, the test data set 22 consists of raw data about the active assets of business groups which were installed on specific dates. Here, five different business groups are identified, and facilities corresponding to the different business groups are categorized into four different item types. The test data set 22 is imported by the test data importer 24, and then used by the ETL pipeline 18 and the assert data generation pipeline 32 to generate output data 30 and assert data 38, respectively.

Figure 3:
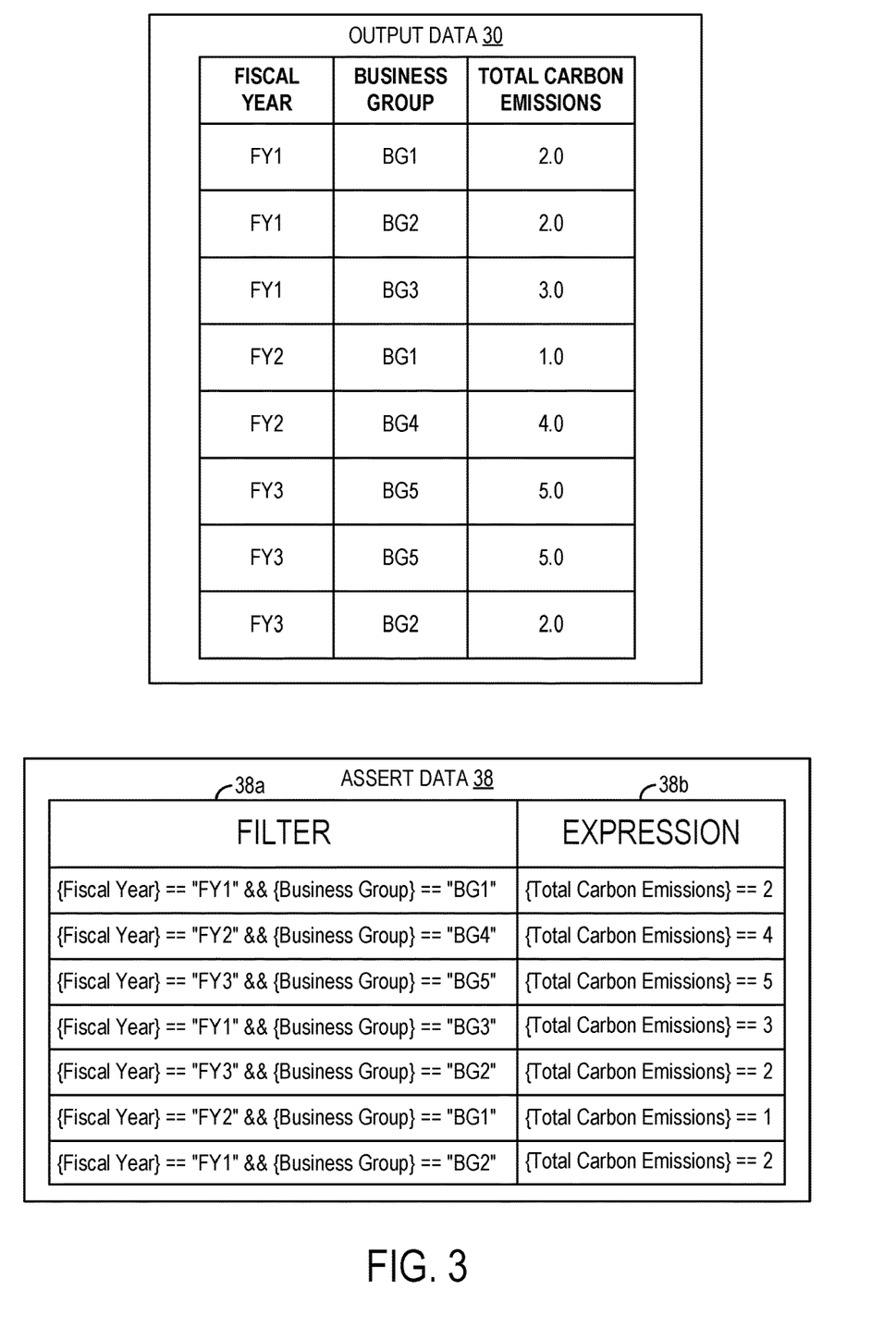
FIG. 3 shows examples of the output data and assert data of the computing system of FIG. 1.

Turning to FIG. 3, examples of the output data 30 and assert data 38 generated based on the test data set 22 of FIG. 2 are depicted. The transform module 26 of the ETL pipeline 18 transforms the imported test data set 22 into a desired format or structure. In this example, the transformations performed by the transform module 26 includes removing the columns 'asset tag', 'facility number', and 'item type', and simplifying the 'date' column to only indicate the fiscal year without indicating the month or day. The transformations also include calculating the carbon emissions for each facility based on the facility number, and adding a 'Total Carbon Emissions' column including the calculated carbon emissions for each facility.

The assert data generator 36 of the assert data generation pipeline 32 generates the assert data 38 based on the test data set 22. In this example, the assert data generator 36 generates assert data 38 including assertions which assert certain total carbon emissions values for different pairs of fiscal year and business group. These assertions are formulated into pairs of filters 38a and expressions 38b. As shown in the example of FIG. 3, the first assertion specifies that the output data 30 of the ETL pipeline 18 must meet the expression "{total carbon emissions}=2" for rows with a value of {Fiscal Year} equal to "FY1" and a value of {Business Group} equal to "BG1".

When the assertions are run, the assert data 38 is compared to the output data 30, and the output data 30 is checked to validate that the output values meet the criteria specified by the assertions of the assert data 38. When any row in the output data 30 does not meet any assertion of the assert data 38, then an error is raised.

Figure 4:
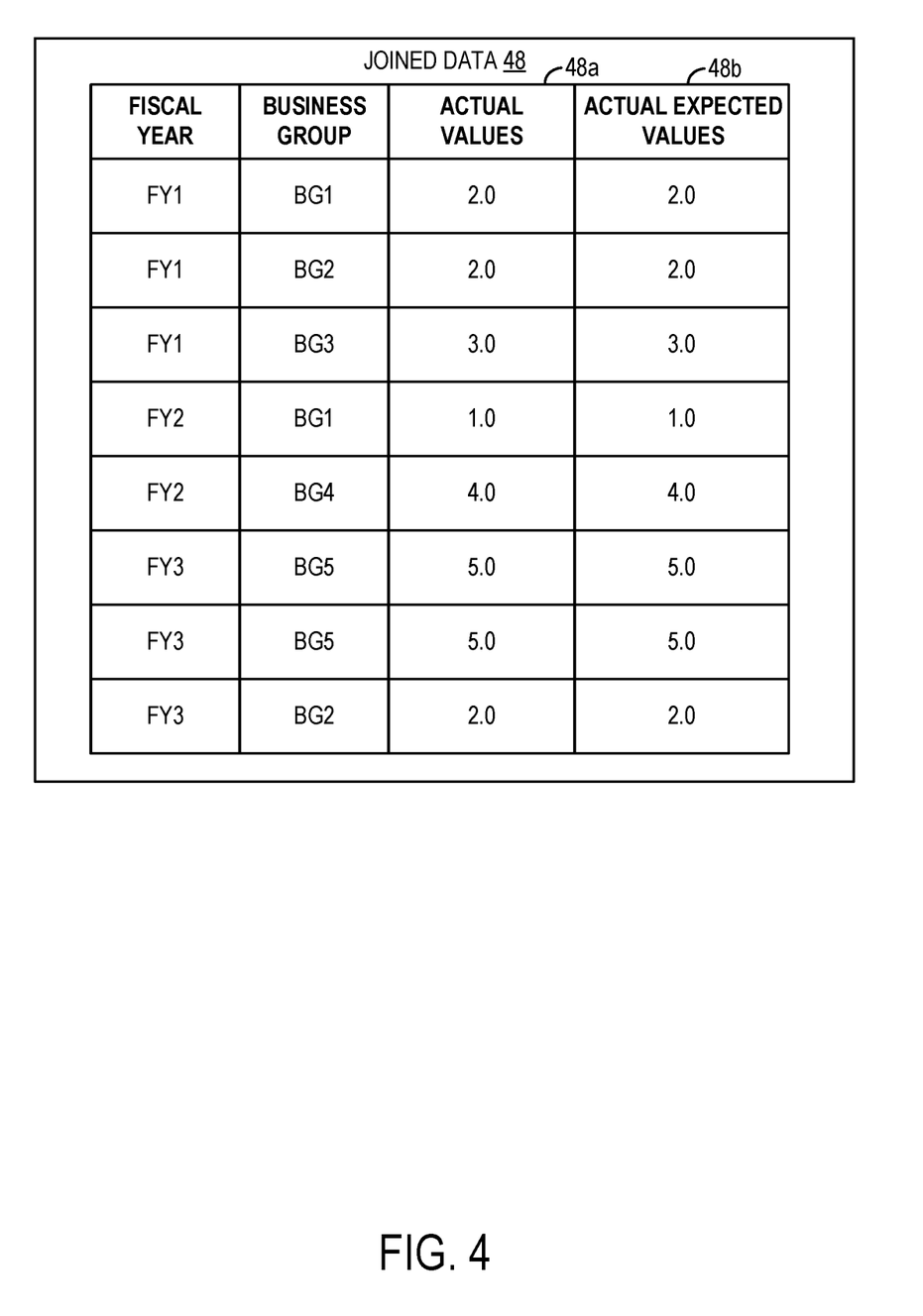
FIG. 4 shows an example of the joined data of the computing system of FIG. 1.

Turning to FIG. 4, an example of the joined data 48 generated based on the output data 30 and assert data 38 of FIG. 3 is depicted. The assertions of the assert data 38 are joined to the output data 30 by the join function 44, and then a compute function 46 computes the actual values of the output data 30 to be validated by creating an assert actual value column 48a containing the values in the columns of the output data 30 to be validated. An actual expected value column 48b is created to calculate what the actual values in the actual value column 48a are expected to be based on the filter criteria 38a of the assert data 38. For example, the first row indicates a fiscal year of FY1 and business group BG1. Based on the assert data 38 of FIG. 3, an asset installed in fiscal year FY1 and business group BG1 would be expected to have total carbon emissions of 2. Therefore, the actual expected value 48b for the first row is 2.

Figure 5:
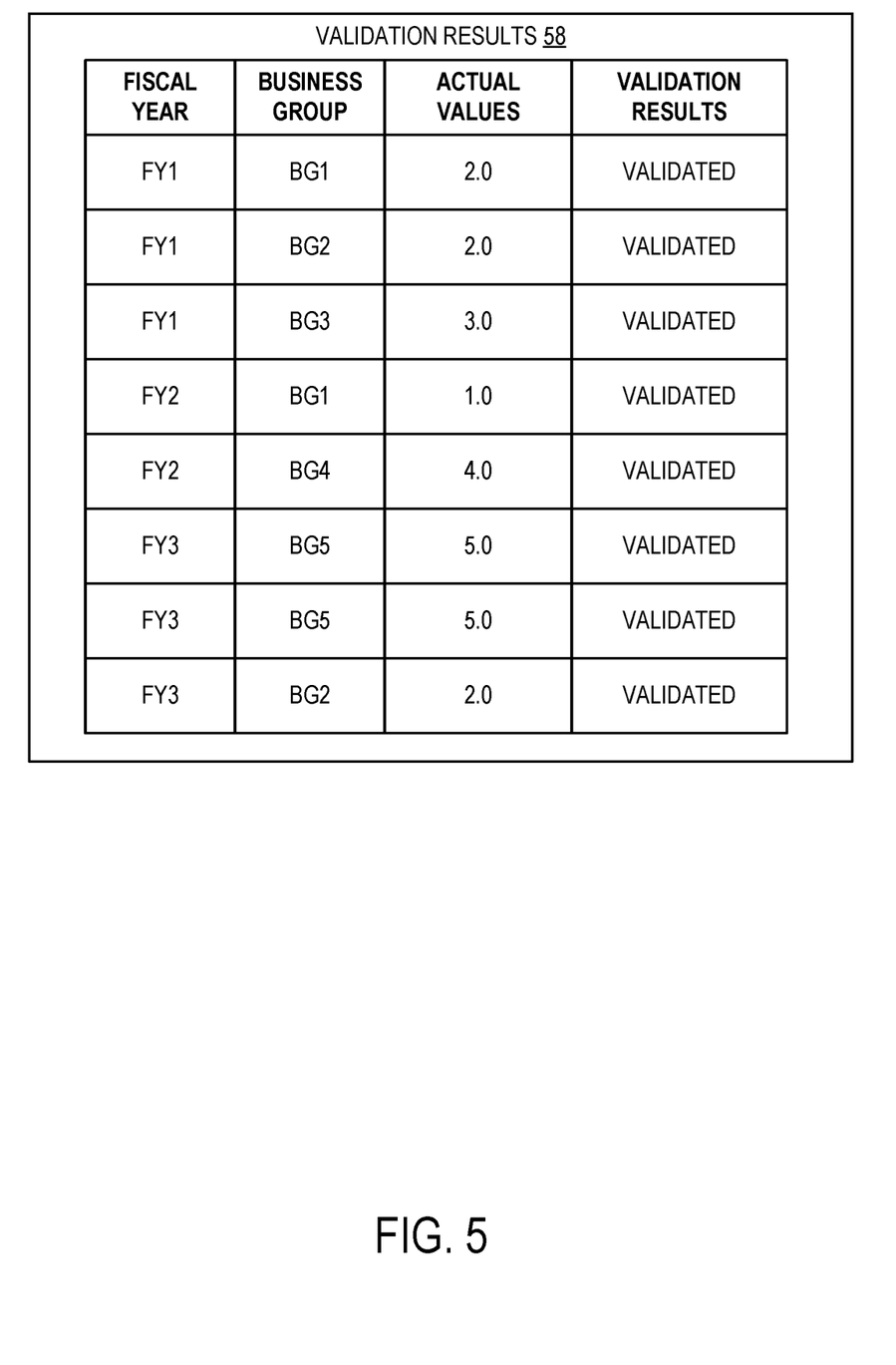
FIG. 5 shows an example of the validation results of the computing system of FIG. 1.

Subsequently, an append function 50 appends the assert description to the assert actual value column 48a, so that failed values can easily be identified during validation. Then the validation results 58 are generated by running the assertions in the assert data 38. FIG. 5 shows an example of the validation results 58, which indicate whether the actual values in each row meet the criteria of the assertions of the assert data 38. In the example of FIG. 5, all of the actual values have met the criteria of the assertions of the assert data 38.

Figure 6:
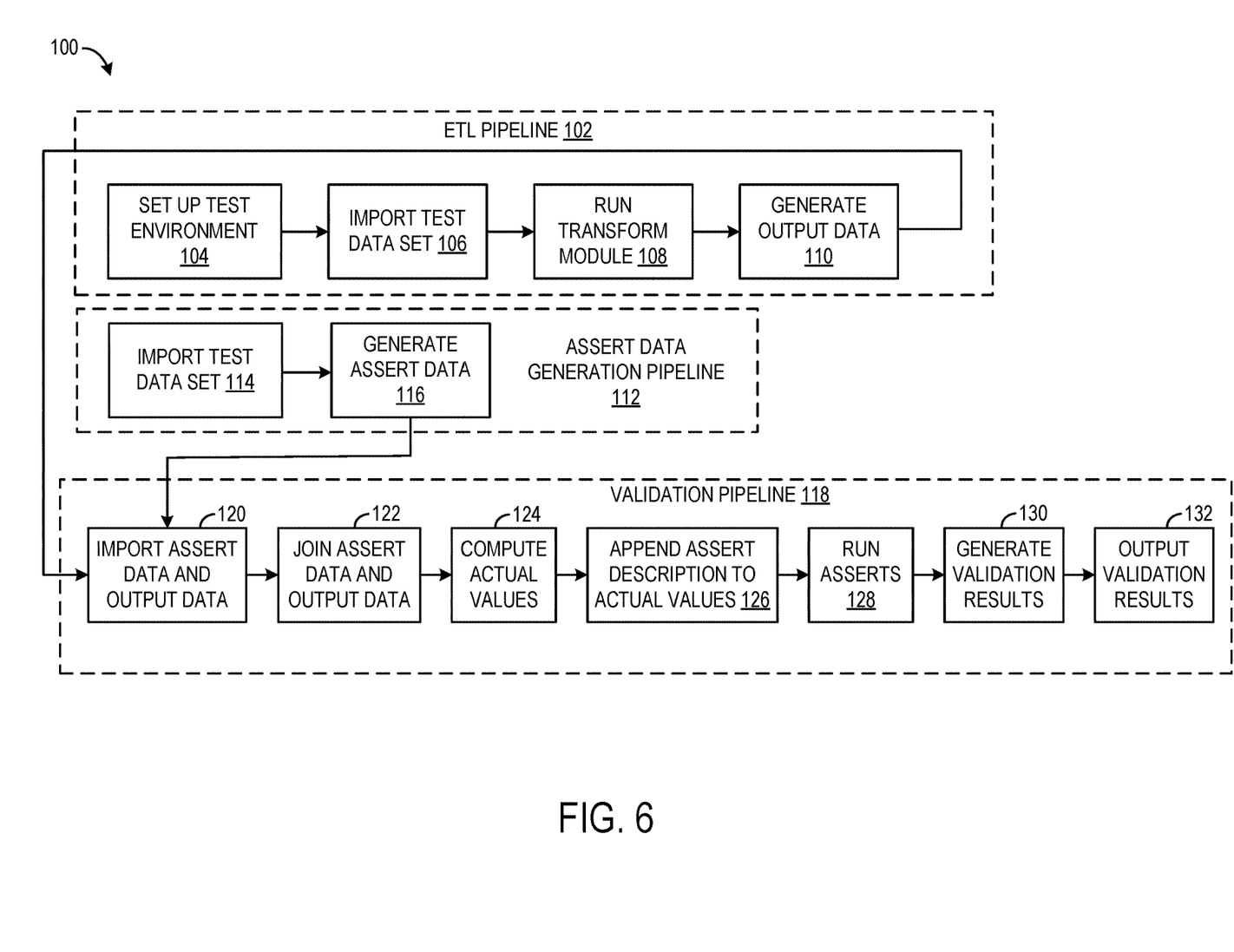
FIG. 6 shows a flowchart of a computerized method including an ETL pipeline, an assert data generation pipeline, and a validation pipeline, according to an example embodiment of the present disclosure.

Turning to FIG. 6, a flowchart is illustrated of a computerized method 100 for validating output data of an ETL pipeline. The following description of the first computerized method 100 is provided with reference to the software and hardware components described above and shown in FIGS. 1-5. It will be appreciated that computerized method 100 also can be performed in other contexts using other suitable hardware and software components. The computerized method 100 comprises an ETL pipeline 102, an assert generation pipeline 112, and a validation pipeline 118.

The ETL pipeline 102 includes a step 104 for setting up a test environment, a step 106 for importing the test data set, a step 108 for running the transform module of the ETL pipeline 102 to transform the imported test data set, and a step 110 for generating output data, which is outputted to be imported by the validation pipeline 118.

The assert data generation pipeline 112 includes a step 114 for importing the test data set, and a step 116 for generating the assert data based on the imported test data set. The assertions of the assert data are used in the validation pipeline 118 to validate the output data.

The validation pipeline 118 performs validation of the output data generated by the ETL pipeline 102 using the assert data generated by the assert data generation pipeline 112. At step 120, the assert data and the output data are imported. The imported output data may be mapped to appropriate tables and columns, thereby ensuring that the output data is stored in a format that can be easily queried and analyzed. At step 122, the assert data and the output data are joined together. At step 124, the actual values are computed. The actual values of the output data to be validated may be computed by creating an assert actual value column containing the values in the columns of the output data to be validated. At step 126, the assert description is appended to the actual values, so that failed values can easily be identified during validation. At step 128, the assertions in the assert data are run to compare the assert data to the output data. At step 130, the validation results are generated by running the asserts in the assert data. At step 132, the validation results are outputted for display. The validation results may include assert descriptions which are displayed for failed values in the output data.

The above-described system and method implement assertions for validating the output of ETL pipelines, thereby ensuring the accuracy, completeness, and consistency of the data outputted by the ETL pipelines. Accordingly, the risk of errors or inaccuracies outputted by the ETL pipelines can be reduced by detecting errors and inconsistencies in the ETL pipelines.

In some embodiments, the methods and processes described herein may be tied to a computing system of one or more computing devices. In particular, such methods and processes may be implemented as a computer-application program or service, an application-programming interface (API), a library, and/or other computer-program product executed by the one or more computing devices.

Figure 7:
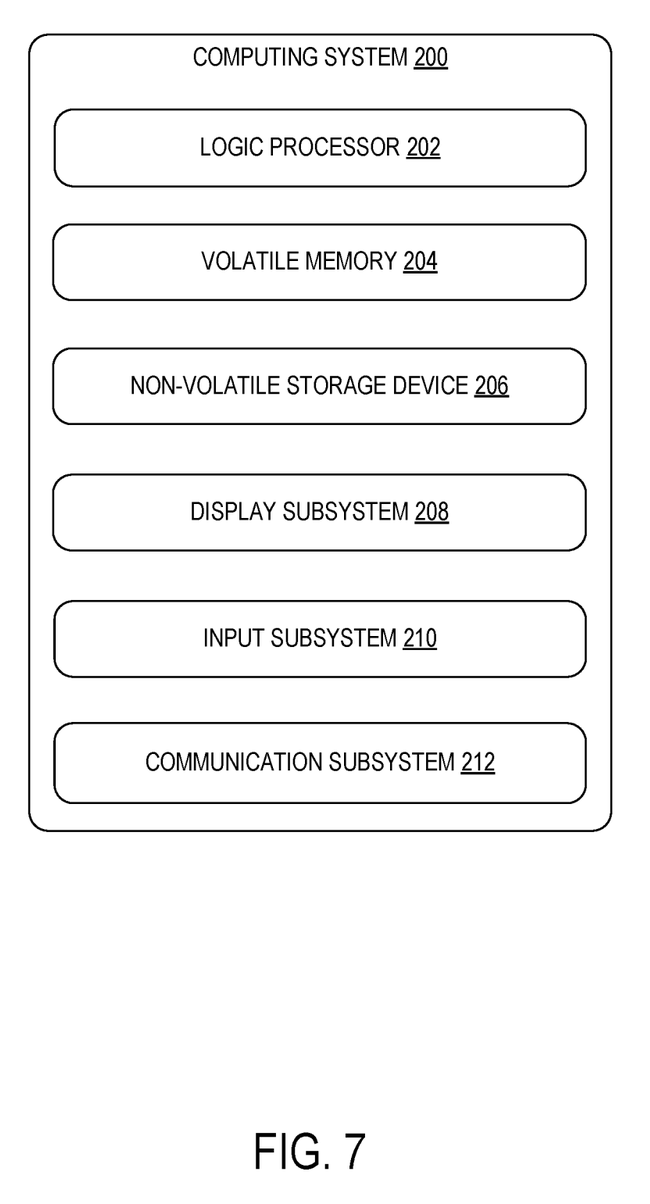
FIG. 7 shows a schematic view of an example computing environment that may be used to implement the systems and methods of FIGS. 1-6.

FIG. 7 schematically shows a non-limiting embodiment of a computing system 200 that can enact one or more of the methods and processes described above. Computing system 200 is shown in simplified form. Computing system 200 may embody the computing system 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor 202 may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology that may be used in cloud storage. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program—and application-specific integrated circuits (PASIC/ASICs), program—and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch pad, touch screen, microphone, camera, etc.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

The following paragraphs provide additional support for the claims of the subject application. One aspect provides a computing system comprising a processor, and a memory storing executable instructions that, in response to execution by the processor cause the processor to instantiate a testing environment, define an extract, transform, load (ETL) pipeline within the testing environment, generate a test data set to be inputted into the ETL pipeline, generate assert data predicting an output of the ETL pipeline, based on the generated test data set, input the test data set into the ETL pipeline to generate output data, compare the assert data to the output data, and validate the output data using the assert data to generate validation data. In this aspect, additionally or alternatively, the assert data may include a Boolean expression that express a probability that a property of the output data is true. In this aspect, additionally or alternatively, the assert data may include an assertion specifying that values in the output data follow a predetermined format or pattern. In this aspect, additionally or alternatively, the generated validation data may be used to modify the ETL pipeline. In this aspect, additionally or alternatively, the assert data may contain a property specifying how assertions of the assert data are associated with the output data. In this aspect, additionally or alternatively, the property may define which columns in the assertions correspond to which columns in the output data. In this aspect, additionally or alternatively, actual values of the output data to be validated may be computed by creating an assert actual values column containing values in columns of the output data to be validated. In this aspect, additionally or alternatively, an assert description may be appended to the assert actual values column. In this aspect, additionally or alternatively, upon failure of validation, the assert description may be displayed for failed values in the output data.

Another aspect provides a computerized method comprising instantiating a testing environment, defining an extract, transform, load (ETL) pipeline within the testing environment, generating a test data set to be inputted into the ETL pipeline, generating assert data predicting an output of the ETL pipeline, based on the generated test data set, inputting the test data set into the ETL pipeline to generate output data, comparing the assert data to the output data, and validating the output data using the assert data to generate validation data. In this aspect, additionally or alternatively, the assert data may include a Boolean expression that express a probability that a property of the output data is true. In this aspect, additionally or alternatively, the assert data may include an assertion specifying that values in the output data follow a predetermined format or pattern. In this aspect, additionally or alternatively, the generated validation data may be used to modify the ETL pipeline. In this aspect, additionally or alternatively, the assert data may contain a property specifying how assertions of the assert data are associated with the output data. In this aspect, additionally or alternatively, the property may define which columns in the assertions correspond to which columns in the output data. In this aspect, additionally or alternatively, actual values of the output data to be validated may be computed by creating an assert actual values column containing values in columns of the output data to be validated. In this aspect, additionally or alternatively, an assert description may be appended to the assert actual values column. In this aspect, additionally or alternatively, upon failure of validation, the assert description may be displayed for failed values in the output data.

Another aspect provides a computing system comprising a processor, and a memory storing executable instructions that, in response to execution by the processor cause the processor to receive output data generated by an extract, transform, load (ETL) pipeline, receive assert data generated based on the output data, join the assert data to the output data, compute actual values of the output data to be validated by creating an assert actual values column containing values in columns of the output data to be validated, append an assert description to the assert actual values column, run assertions in the assert data to compare the assert data to the output data, and generate validation results. In this aspect, additionally or alternatively, the generated validation data may be used to modify the ETL pipeline.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor; and
a memory storing executable instructions that, in response to execution by the processor cause the processor to:
instantiate a testing environment;
define an extract, transform, load (ETL) pipeline within the testing environment;
generate a test data set to be inputted into the ETL pipeline;
generate assert data predicting an output of the ETL pipeline, based on the generated test data set, the assert data comprising at least one validation assertion;
input the test data set into the ETL pipeline to generate output data;
compare the assert data to the output data; and
validate the output data using the assert data by determining whether the at least one validation assertion is true for the output data, so as to generate validation data.

2. The computing system of claim 1, wherein the assert data includes a Boolean expression that express a probability that a property of the output data is true.

3. The computing system of claim 1, wherein the assert data includes an assertion specifying that values in the output data follow a predetermined format or pattern.

4. The computing system of claim 1, wherein the generated validation data is used to modify the ETL pipeline.

5. The computing system of claim 1, wherein the assert data contains a property specifying how assertions of the assert data are associated with the output data.

6. The computing system of claim 5, wherein the property defines which columns in the assertions correspond to which columns in the output data.

7. The computing system of claim 1, wherein actual values of the output data to be validated are computed by creating an assert actual values column containing values in columns of the output data to be validated.

8. The computing system of claim 7, wherein an assert description is appended to the assert actual values column.

9. The computing system of claim 8, wherein upon failure of validation, the assert description is displayed for failed values in the output data.

10. A computerized method comprising:
instantiating a testing environment;
defining an extract, transform, load (ETL) pipeline within the testing environment;
generating a test data set to be inputted into the ETL pipeline;
generating assert data predicting an output of the ETL pipeline, based on the generated test data set, the assert data comprising at least one validation assertion;
inputting the test data set into the ETL pipeline to generate output data;
comparing the assert data to the output data; and
validating the output data using the assert data by determining whether the at least one validation assertion is true for the output data, so as to generate validation data.

11. The computerized method of claim 10, wherein the assert data includes a Boolean expression that express a probability that a property of the output data is true.

12. The computerized method of claim 10, wherein the assert data includes an assertion specifying that values in the output data follow a predetermined format or pattern.

13. The computerized method of claim 10, wherein the generated validation data is used to modify the ETL pipeline.

14. The computerized method of claim 10, wherein the assert data contains a property specifying how assertions of the assert data are associated with the output data.

15. The computerized method of claim 14, wherein the property defines which columns in the assertions correspond to which columns in the output data.

16. The computerized method of claim 10, wherein actual values of the output data to be validated are computed by creating an assert actual values column containing values in columns of the output data to be validated.

17. The computerized method of claim 16, wherein an assert description is appended to the assert actual values column.

18. The computerized method of claim 17, wherein upon failure of validation, the assert description is displayed for failed values in the output data.

19. A computing system comprising:
a processor; and
a memory storing executable instructions that, in response to execution by the processor cause the processor to:
receive output data generated by an extract, transform, load (ETL) pipeline;
receive assert data generated based on the output data, the assert data comprising at least one validation assertion;
join the assert data to the output data;
compute actual values of the output data to be validated by creating an assert actual values column containing values in columns of the output data to be validated;
append an assert description to the assert actual values column;
run assertions in the assert data to compare the assert data to the output data to determine whether the at least one validation assertion in the assert data is true for the output data; and
generate validation results.

20. The computing system of claim 19, wherein the generated validation data is used to modify the ETL pipeline.

* * * * *